United States Patent
Kreiner et al.

(10) Patent No.: US 7,609,832 B2
(45) Date of Patent: Oct. 27, 2009

(54) REAL-TIME CLIENT SURVEY SYSTEMS AND METHODS

(75) Inventors: Barrett Kreiner, Norcross, GA (US); Ronald Perrella, Norcross, GA (US); John Slemmer, Norcross, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 1351 days.

(21) Appl. No.: 10/702,329

(22) Filed: Nov. 6, 2003

(65) Prior Publication Data

US 2005/0100158 A1 May 12, 2005

(51) Int. Cl.
*H04M 3/00* (2006.01)
*H04M 3/42* (2006.01)

(52) U.S. Cl. .............................. 379/265.02; 379/212.01

(58) Field of Classification Search ............ 379/265.02, 379/212.01
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |
| 4,823,304 A | 4/1989 | Frantz et al. | |
| 4,845,743 A | 7/1989 | Lutz | |
| 4,850,013 A | 7/1989 | Rose | |
| 4,850,103 A | 7/1989 | Takemoto et al. | |
| 4,995,075 A | 2/1991 | Angiolillo-Bent et al. | |
| 5,029,196 A | 7/1991 | Morganstein | |

(Continued)

FOREIGN PATENT DOCUMENTS

EP 0821511 1/1998

(Continued)

OTHER PUBLICATIONS

AASTRA Telecom, Press Release, Aastra Telecom Introduces CNX Conference Bridge, Aug. 29, 2005, 1 page.

(Continued)

*Primary Examiner*—Rasha S Al Aubaidi
(74) *Attorney, Agent, or Firm*—Cantor Colburn LLP

(57) ABSTRACT

A system and method is provided that includes an automatic call distribution system adapted to communicate over a network and includes a first software control module. The automatic call distribution system is configured to route incoming calls received from the network to a call agent station in communication therewith based on the availability of call agent station. The system provides an interactive voice response system in communication with the automatic call distribution system for administering a survey to a client in communication with the call agent station. Under the control of the first software control module, the automatic call distribution system routes the incoming call from the call agent station to the interactive voice response system for administering the survey to the client.

20 Claims, 2 Drawing Sheets

U.S. PATENT DOCUMENTS

| | | |
|---|---|---|
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| 5,724,412 A | 3/1998 | Srinivasan |
| 5,734,706 A | 3/1998 | Windsor et al. |
| 5,742,668 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,943,416 A * | 8/1999 | Gisby .................. 379/265.13 |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |

| | | | |
|---|---|---|---|
| 6,031,899 A | 2/2000 | Wu | |
| 6,044,148 A | 3/2000 | Bleile | |
| 6,049,291 A | 4/2000 | Kikinis | |
| 6,058,171 A | 5/2000 | Hoopes | |
| 6,061,434 A | 5/2000 | Corbett | |
| 6,061,566 A | 5/2000 | Friman | |
| 6,064,876 A | 5/2000 | Ishida et al. | |
| 6,065,844 A | 5/2000 | Chen | |
| 6,072,859 A | 6/2000 | Kong | |
| 6,078,581 A | 6/2000 | Shtivelman et al. | |
| 6,091,947 A | 7/2000 | Sumner | |
| 6,094,478 A | 7/2000 | Shepherd et al. | |
| 6,094,573 A | 7/2000 | Heinonen et al. | |
| 6,094,574 A | 7/2000 | Vance et al. | |
| 6,094,575 A | 7/2000 | Anderson et al. | |
| 6,101,246 A | 8/2000 | Heinmiller et al. | |
| 6,104,784 A | 8/2000 | Robbins | |
| 6,104,800 A | 8/2000 | Benson | |
| 6,108,630 A | 8/2000 | Kuechler et al. | |
| 6,111,939 A | 8/2000 | Brabanec | |
| 6,134,235 A | 10/2000 | Goldman et al. | |
| 6,134,311 A | 10/2000 | Ekstrom | |
| 6,137,870 A | 10/2000 | Scherer | |
| 6,137,871 A | 10/2000 | Maier et al. | |
| 6,141,341 A | 10/2000 | Jones et al. | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | |
| 6,163,691 A | 12/2000 | Buettner et al. | |
| 6,167,254 A | 12/2000 | Chavez, Jr. et al. | |
| 6,169,911 B1 | 1/2001 | Wagner et al. | |
| 6,173,049 B1 | 1/2001 | Malik | |
| 6,178,232 B1 | 1/2001 | Latter et al. | |
| 6,181,928 B1 | 1/2001 | Moon | |
| D437,879 S | 2/2001 | Weinandt | |
| 6,185,289 B1 | 2/2001 | Hetz et al. | |
| 6,185,426 B1 | 2/2001 | Alperovich | |
| 6,192,115 B1 | 2/2001 | Toy et al. | |
| 6,192,116 B1 | 2/2001 | Mayak | |
| 6,198,480 B1 | 3/2001 | Cotugno et al. | |
| 6,198,920 B1 | 3/2001 | Doviak et al. | |
| 6,202,023 B1 | 3/2001 | Hancock et al. | |
| 6,219,407 B1 | 4/2001 | Kanevsky et al. | |
| 6,222,826 B1 | 4/2001 | Faynberg et al. | |
| 6,226,367 B1 | 5/2001 | Smith et al. | |
| 6,226,369 B1 | 5/2001 | Lim et al. | |
| 6,226,399 B1 | 5/2001 | Robinson | |
| 6,230,006 B1 | 5/2001 | Keenan et al. | |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang | |
| 6,252,952 B1 | 6/2001 | Kung et al. | |
| 6,256,671 B1 | 7/2001 | Strentzch et al. | |
| 6,262,987 B1 | 7/2001 | Mogul | |
| 6,266,399 B1 | 7/2001 | Weller et al. | |
| 6,278,704 B1 | 8/2001 | Creamer et al. | |
| 6,278,862 B1 | 8/2001 | Henderson | |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,295,502 B1 | 9/2001 | Hancock et al. | |
| 6,301,342 B1 | 10/2001 | Ander et al. | |
| 6,301,350 B1 | 10/2001 | Henningson et al. | |
| 6,304,644 B2 | 10/2001 | Karnowski | |
| 6,310,943 B1 | 10/2001 | Kowalski | |
| 6,311,057 B1 | 10/2001 | Barvesten | |
| 6,317,488 B1 | 11/2001 | DePond et al. | |
| 6,317,781 B1 | 11/2001 | De Boor et al. | |
| 6,324,263 B1 | 11/2001 | Sherwood et al. | |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,904 B1 | 1/2002 | Gisby | |
| 6,337,979 B1 | 1/2002 | Nakayasu | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,140 B1 | 3/2002 | Pinard | |
| 6,363,411 B1 | 3/2002 | Dugan et al. | |
| 6,366,661 B1 | 4/2002 | Devillier et al. | |
| 6,366,772 B1 | 4/2002 | Arnson | |
| 6,377,807 B1 | 4/2002 | Iparrea et al. | |
| 6,377,979 B1 | 4/2002 | Yamashita et al. | |
| 6,389,124 B1 | 5/2002 | Schnarel et al. | |
| 6,400,809 B1 | 6/2002 | Bossemeyer, Jr. et al. | |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | |
| 6,422,263 B1 | 7/2002 | Spicer | |
| 6,427,003 B1 | 7/2002 | Corbett et al. | |
| 6,427,064 B1 | 7/2002 | Henderson | |
| 6,434,394 B1 | 8/2002 | Grundvig et al. | |
| 6,437,879 B1 | 8/2002 | Temple | |
| 6,438,216 B1 | 8/2002 | Aktas | |
| 6,438,217 B1 | 8/2002 | Huna | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | |
| 6,462,646 B2 | 10/2002 | Helferich | |
| 6,466,653 B1 | 10/2002 | Hamrick et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | |
| 6,493,439 B2 | 12/2002 | Lung et al. | |
| 6,494,953 B2 | 12/2002 | Hayes et al. | |
| 6,496,569 B2 | 12/2002 | Pelletier et al. | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |
| 6,542,586 B1 | 4/2003 | Helstab | |
| 6,542,591 B1 | 4/2003 | Amro et al. | |
| 6,542,602 B1 | 4/2003 | Elazar | |
| 6,542,812 B1 | 4/2003 | Obradovich et al. | |
| 6,546,092 B1 | 4/2003 | Corbett et al. | |
| 6,549,621 B1 | 4/2003 | Christie, IV et al. | |
| 6,553,110 B1 | 4/2003 | Peng | |
| 6,553,221 B2 | 4/2003 | Nakamura et al. | |
| 6,556,540 B1 | 4/2003 | Mawhinney et al. | |
| 6,560,317 B1 | 5/2003 | Quagliana | |
| 6,560,327 B1 | 5/2003 | McConnell | |
| 6,566,995 B2 | 5/2003 | Furuuchi et al. | |
| 6,570,971 B2 | 5/2003 | Latter et al. | |

| | | | | | | |
|---|---|---|---|---|---|---|
| 6,570,974 | B1 | 5/2003 | Gerszberg et al. | 6,865,266 | B1 | 3/2005 | Pershan |
| 6,574,319 | B2 | 6/2003 | Latter et al. | 6,865,384 | B2 | 3/2005 | Sagi et al. |
| 6,580,904 | B2 | 6/2003 | Cox et al. | 6,868,155 | B1 | 3/2005 | Cannon et al. |
| 6,584,490 | B1 | 6/2003 | Schuster et al. | 6,870,924 | B1 | 3/2005 | Ukon |
| 6,587,458 | B1 | 7/2003 | Burg et al. | 6,888,927 | B1 | 5/2005 | Cruickshank et al. |
| 6,590,970 | B1 | 7/2003 | Cai et al. | 6,888,972 | B2 | 5/2005 | Berg et al. |
| 6,597,905 | B1 | 7/2003 | Hijii | 6,891,940 | B1 | 5/2005 | Bhandari et al. |
| 6,603,840 | B2 | 8/2003 | Fellingham et al. | 6,898,275 | B2 | 5/2005 | Dolan et al. |
| 6,603,854 | B1 | 8/2003 | Judkins et al. | 6,904,276 | B1 | 6/2005 | Freeman et al. |
| 6,608,891 | B1 | 8/2003 | Pelletier et al. | 6,907,034 | B1 | 6/2005 | Begis |
| 6,618,474 | B1 | 9/2003 | Reese | 6,909,777 | B2 | 6/2005 | Latter et al. |
| 6,625,595 | B1 | 9/2003 | Anderson et al. | 6,914,953 | B2 | 7/2005 | Boerstler |
| 6,631,181 | B1 | 10/2003 | Bates et al. | 6,922,411 | B1 | 7/2005 | Taylor |
| 6,633,633 | B1 | 10/2003 | Bedingfield | 6,928,154 | B1 | 8/2005 | Cheaito et al. |
| 6,639,979 | B1 | 10/2003 | Kim | 6,931,007 | B2 | 8/2005 | Jones |
| 6,650,743 | B2 | 11/2003 | Heinmiller et al. | 6,947,531 | B1 | 9/2005 | Lewis et al. |
| 6,659,597 | B2 | 12/2003 | Murata et al. | 6,952,469 | B2 | 10/2005 | Han |
| 6,661,785 | B1 | 12/2003 | Zhang et al. | 6,970,546 | B2 | 11/2005 | Kent, Jr. et al. |
| 6,665,388 | B2 | 12/2003 | Bedingfield | 6,977,993 | B2 | 12/2005 | Starbuck et al. |
| 6,665,715 | B1 | 12/2003 | Houri | 6,996,211 | B2 | 2/2006 | Reynolds et al. |
| 6,683,870 | B1 | 1/2004 | Archer | 7,012,999 | B2 | 3/2006 | Ruckart |
| 6,687,341 | B1 | 2/2004 | Koch et al. | 7,016,482 | B2 | 3/2006 | Moss et al. |
| 6,697,357 | B2 | 2/2004 | Emerson, III | 7,027,408 | B2 | 4/2006 | Nabkel et al. |
| 6,701,160 | B1 | 3/2004 | Pinder et al. | 7,027,569 | B2 | 4/2006 | Price |
| 6,718,021 | B2 | 4/2004 | Crockett et al. | 7,076,051 | B2 | 7/2006 | Brown et al. |
| 6,721,407 | B1 | 4/2004 | Michelena | 7,079,837 | B1 | 7/2006 | Sherman et al. |
| 6,724,872 | B1 | 4/2004 | Moore et al. | 7,085,358 | B2 | 8/2006 | Ruckart et al. |
| 6,725,872 | B2 | 4/2004 | Kindell et al. | 7,085,578 | B2 | 8/2006 | Barclay et al. |
| 6,728,355 | B2 | 4/2004 | Kowalski | 7,095,715 | B2 | 8/2006 | Buckman et al. |
| 6,728,360 | B1 | 4/2004 | Brennan | 7,097,169 | B2 | 8/2006 | Mueller |
| 6,728,365 | B1 | 4/2004 | Li et al. | 7,103,167 | B2 | 9/2006 | Brahm et al. |
| 6,731,727 | B2 | 5/2004 | Corbett et al. | 7,113,577 | B2 | 9/2006 | Cook et al. |
| 6,732,188 | B1 | 5/2004 | Flockhart et al. | 7,127,488 | B1 | 10/2006 | Scott et al. |
| 6,738,615 | B1 | 5/2004 | Chow et al. | 7,139,374 | B1 | 11/2006 | Scott et al. |
| 6,748,058 | B1 | 6/2004 | Schwend et al. | 7,152,118 | B2 | 12/2006 | Anderson, IV et al. |
| 6,748,068 | B1 | 6/2004 | Walsh et al. | 7,155,211 | B2 | 12/2006 | Mun et al. |
| 6,751,457 | B1 | 6/2004 | Martin | 7,184,533 | B1 | 2/2007 | Shaffer et al. |
| 6,757,274 | B1 | 6/2004 | Bedingfield et al. | 7,228,129 | B1 | 6/2007 | Ward et al. |
| 6,757,740 | B1 | 6/2004 | Parekh et al. | 2001/0002209 | A1 | 5/2001 | Han |
| 6,760,413 | B2 | 7/2004 | Cannon et al. | 2001/0005854 | A1 | 6/2001 | Murata et al. |
| 6,765,998 | B2 | 7/2004 | Bruce et al. | 2001/0036174 | A1 | 11/2001 | Herring |
| 6,766,003 | B2 | 7/2004 | Moss et al. | 2001/0044898 | A1 | 11/2001 | Benussi et al. |
| 6,768,792 | B2 | 7/2004 | Brown et al. | 2001/0048737 | A1 | 12/2001 | Goldberg et al. |
| D494,953 | S | 8/2004 | Leung | 2002/0009184 | A1 | 1/2002 | Shnier |
| 6,771,754 | B2 | 8/2004 | Pelletier et al. | 2002/0016748 | A1 | 2/2002 | Emodi et al. |
| 6,771,755 | B1 | 8/2004 | Simpson | 2002/0041605 | A1 | 4/2002 | Benussi et al. |
| 6,771,956 | B1 | 8/2004 | Beeler | 2002/0055926 | A1 | 5/2002 | Dan et al. |
| 6,775,366 | B1 | 8/2004 | Cobbett et al. | 2002/0067816 | A1 | 6/2002 | Bushnell |
| 6,775,540 | B2 | 8/2004 | Iyer | 2002/0077102 | A1 | 6/2002 | Achuthan et al. |
| 6,778,524 | B1 | 8/2004 | Augart | 2002/0082050 | A1 | 6/2002 | Mountney et al. |
| 6,779,020 | B1 | 8/2004 | Henrick | 2002/0085687 | A1 | 7/2002 | Contractor et al. |
| 6,785,301 | B1 | 8/2004 | Chapman et al. | 2002/0090933 | A1 | 7/2002 | Rouse et al. |
| 6,785,368 | B1 | 8/2004 | Eason et al. | 2002/0094826 | A1 | 7/2002 | Lee |
| 6,785,540 | B1 | 8/2004 | Wichelman | 2002/0118812 | A1 | 8/2002 | Contractor |
| 6,792,266 | B1 | 9/2004 | Masuda et al. | 2002/0119430 | A1 | 8/2002 | Szynalski |
| 6,798,841 | B2 | 9/2004 | Hansen | 2002/0120629 | A1 | 8/2002 | Leonard |
| 6,798,879 | B1 | 9/2004 | Beham | 2002/0122401 | A1 | 9/2002 | Xiang et al. |
| 6,807,267 | B2 | 10/2004 | Moss et al. | 2002/0125929 | A1 | 9/2002 | Chen et al. |
| 6,810,077 | B1 | 10/2004 | Dezonno | 2002/0183098 | A1 | 12/2002 | Lee et al. |
| 6,810,115 | B2 | 10/2004 | Fukuda | 2002/0188443 | A1 | 12/2002 | Reddy et al. |
| 6,813,344 | B1 | 11/2004 | Lemke | 2002/0191755 | A1 | 12/2002 | Lew et al. |
| 6,816,481 | B1 | 11/2004 | Adams et al. | 2002/0197991 | A1 | 12/2002 | Anvekar et al. |
| 6,818,474 | B2 | 11/2004 | Kim et al. | 2003/0007620 | A1 | 1/2003 | Elsey et al. |
| 6,826,271 | B1 | 11/2004 | Kanabar et al. | 2003/0012353 | A1 | 1/2003 | Tang |
| 6,826,617 | B1 | 11/2004 | Ansell et al. | 2003/0016143 | A1 | 1/2003 | Ghazarian |
| 6,830,595 | B2 | 12/2004 | Reynolds, III | 2003/0016800 | A1 | 1/2003 | Fukuda |
| 6,831,974 | B1 | 12/2004 | Watson et al. | 2003/0021290 | A1 | 1/2003 | Jones |
| 6,842,512 | B2 | 1/2005 | Pedersen | 2003/0026413 | A1 | 2/2003 | Brandt et al. |
| 6,845,151 | B2 | 1/2005 | Peng | 2003/0026416 | A1 | 2/2003 | Fusco |
| 6,853,710 | B2 | 2/2005 | Harris | 2003/0032414 | A1 | 2/2003 | Melaku |
| 6,853,711 | B2 | 2/2005 | Brisebois et al. | 2003/0050100 | A1 | 3/2003 | Dent |
| 6,856,677 | B2 | 2/2005 | Leijonhufvud | 2003/0053602 | A1 | 3/2003 | Stuckman et al. |
| 6,859,527 | B1 | 2/2005 | Banks et al. | 2003/0063730 | A1 | 4/2003 | Woodring |

| | | | |
|---|---|---|---|
| 2003/0063731 | A1 | 4/2003 | Woodring |
| 2003/0068020 | A1 | 4/2003 | Hamrick et al. |
| 2003/0092384 | A1 | 5/2003 | Ross, III |
| 2003/0092432 | A1 | 5/2003 | Hwang |
| 2003/0095650 | A1 | 5/2003 | Mize |
| 2003/0112938 | A1 | 6/2003 | Kanakubo et al. |
| 2003/0119503 | A1 | 6/2003 | Shohara et al. |
| 2003/0133553 | A1 | 7/2003 | Khakoo et al. |
| 2003/0133653 | A1 | 7/2003 | De Barros et al. |
| 2003/0135562 | A1 | 7/2003 | Himmel et al. |
| 2003/0135626 | A1 | 7/2003 | Ray et al. |
| 2003/0148758 | A1 | 8/2003 | McMullin |
| 2003/0152207 | A1 | 8/2003 | Ryan |
| 2003/0187949 | A1 | 10/2003 | Bhatt et al. |
| 2003/0196206 | A1 | 10/2003 | Shusman |
| 2003/0198322 | A1 | 10/2003 | White, Jr. |
| 2003/0219107 | A1 | 11/2003 | Richardson et al. |
| 2004/0049545 | A1 | 3/2004 | Wayne Lockridge et al. |
| 2004/0101118 | A1 | 5/2004 | Powell |
| 2004/0101124 | A1 | 5/2004 | Koch et al. |
| 2004/0109558 | A1 | 6/2004 | Koch |
| 2004/0114730 | A1 | 6/2004 | Koch et al. |
| 2004/0120475 | A1 | 6/2004 | Bauer et al. |
| 2004/0125929 | A1 | 7/2004 | Pope |
| 2004/0171370 | A1 | 9/2004 | Natarajan |
| 2004/0181587 | A1 | 9/2004 | Cao et al. |
| 2004/0192332 | A1 | 9/2004 | Samn |
| 2004/0202298 | A1 | 10/2004 | Lopez et al. |
| 2004/0202299 | A1 | 10/2004 | Schwartz |
| 2004/0208301 | A1 | 10/2004 | Urban et al. |
| 2004/0208302 | A1 | 10/2004 | Urban et al. |
| 2004/0209604 | A1 | 10/2004 | Urban et al. |
| 2004/0209605 | A1 | 10/2004 | Urban et al. |
| 2004/0209640 | A1 | 10/2004 | Urban et al. |
| 2004/0213207 | A1 | 10/2004 | Silver et al. |
| 2004/0233892 | A1 | 11/2004 | Roberts et al. |
| 2004/0242212 | A1 | 12/2004 | Bacon et al. |
| 2004/0248560 | A1 | 12/2004 | Bedingfield, Sr. et al. |
| 2005/0073999 | A1 | 4/2005 | Koch |
| 2005/0100158 | A1 | 5/2005 | Kreiner et al. |
| 2005/0107074 | A1 | 5/2005 | Zellner |
| 2005/0147228 | A1 | 7/2005 | Perrella et al. |
| 2006/0013375 | A1 | 1/2006 | Smith et al. |
| 2006/0029209 | A1 | 2/2006 | Moton et al. |
| 2006/0152207 | A1 | 7/2006 | Riebel et al. |
| 2006/0153173 | A1* | 7/2006 | Beck et al. .................. 370/352 |

FOREIGN PATENT DOCUMENTS

| | | |
|---|---|---|
| KR | 2002014945 | 2/2002 |
| WO | WO9750225 | 12/1997 |
| WO | 03/030501 A1 | 4/2003 |
| WO | 03/030502 A1 | 4/2003 |
| WO | WO03090432 | 10/2003 |

OTHER PUBLICATIONS

T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.

"Talking Caller ID by Stealth Software;" [online]; [retrieved on Nov. 5, 2001]; retrieved from the Internet http://www.talkingcallerid.com/.

"Time Division Multiple Access (TDMA);" [online]; [retrieved on Mar. 6, 2003]; retrieved from the Internet http://www.iec.org/online/tutorials/tdma/.

"Venture IP Telephone System" AASTRA [online]; [retrieved on Aug. 31, 2001]; retrieved from the Internet http://www.aastra.com/products/callerids/voicecallerid/be-6060.html.

U.S. Appl. No. 10/884,504 to Kreiner, Barrett, et al., filed Jul. 2, 2004.
U.S. Appl. No. 10/746,804 to Perrella, Ronald, et al., filed Dec. 24, 2003.
Patridge, H1714, March 3, 1998.
U.S. Appl. No. 09/812,338, Clayton Smith, "Priviledged and Confidential Information", filed Mar. 19, 2001.
U.S. Appl. No. 10/032,724, Robert Moton, Mark J. Enzmann, and Samuel N. Zellner, "Voice Caller ID", filed Dec. 27, 2001.
U.S. Appl. No. 10/144,555, Scott C. Holt and Robert A. Koch, "Third Party Content for Internet Caller-ID Messages", filed May 13, 2002.
U.S. Appl. No. 10/144,556, Scott C. Holt and Robert A. Koch, "Internet Caller-ID Integration", filed May 13, 2002.
U.S. Appl. No. 10/152,544, Douglas B. Alston and Matthew L. McFee, "Telecommunications Device Ring Tone Apparatuses", Systems and Methods; filed May 21, 2002.
U.S. Appl. No. 10/174,026, James Canton Bedlngfield, Anita H. Simpson, and David A. Levine, "Methods for Using Ain to Deliver Caller ID to Text/Alpha-Numeric Pagers as Well as Other Wireless Devices, for Calls Delivered to Wireless Networks", filed Jun. 18, 2002.
U.S. Appl. No. 10/200,874, David A. Scott and Xiaofeng David Gao, "System and Method for Gathering Information Related to a Geographical Location", filed Jul. 23, 2002.
U.S. Appl. No. 10/200,906, filed Jul. 23, 2002, David A. Scott and Xiaofeng David Gao, "System and Method for Gathering Information Related to a Geographical Location of a Caller in a Public Switched Telephone Network".
Boswell, et al., "An Advanced HF Receiver Design", IEE, HF Radio Systems and Techniques, 1994, 392, 41-47.
Egevang, et al., "The IP Network Address Translator (NAT)", May 1994.
Handley et al., "SIP: Session Initiation Protocol", Mar. 1999.
International Search Report, PCT/US02/29988, Sep. 23, 2002.
International Search Report, PCT/US02/30068, Dec. 9, 2002.
LSSDR LATA Switching Systems Generic Requirements, CLASSSM Feature: Calling Name Delivery Generic Requirements, BellCore Specification, Technical Reference (TR0NWT-001188), Dec. 1, 1991, 103 pages.
LSSGR LATA Switching Systems Generic Requirements, Class Feature: Calling Number Delivery, BellCore Specification, Technical Reference (TR-NWT0000031), Dec. 1992, Issue 4, 32 pages.
Norris, "Transmitter Architectures", The Institute of Electrical Engineers, 1998, Apr. 1 thru Apr. 6.
OKI Silicon Solutions Company, Japan Site, "Multi-Lingual Test-to-Speech Processor ML2110." http://www.oki.com/semi/english/ml2110/html, Nov. 1, 2001.
"RBS 884 PICO System Descriptions", Ericsson 1/1551-AE/LZB 119 2269 Uae Rev A, Apr. 23, 1998, Author Unknown, Feb. 1 thru Feb. 28.
Rekhter, et al., "Address Allocation for Private Internets", Feb. 1996, 8 pages.
Slawson, "Caller ID Basics", Oct. 31, 2001, http://www.testmark.com/develop/tml_callerid_cnt.html. 10 pages.
"Talking Caller ID with Call Waiting", SMARTHOME, http://www.Smarthome.com/5154.html, Aug. 15, 2005, 2 pages.
"Talking Caller ID- Caller ID Software featuring Talking, Paging, Email, Voice Mail, Blocking, Text-to-Speech", Stealth Software, Aug. 15, 2005, http://www.talkingcallerid.com, 4 pages.
Voice-6090 "Talking Caller ID", Aastra Telecom-Taking Caller ID-Voice 9090, http://www.aastra.com/products/callerids/voicecallerid/be-6060.html, Nov. 5, 2001.
Voice-9090 "Taking Caller ID", Aastra Telecom- Taking Caller ID-Voice 9090, http://www.aastra.com/products/callerids/voicecallerid/be-9090.html Nov. 5, 2001.

* cited by examiner

REAL-TIME CLIENT SURVEY SYSTEMS AND METHODS

BACKGROUND

The present invention relates generally and in various embodiments to systems and methods for obtaining feedback from a client on services and/or products provided by an establishment. More specifically, the present invention relates generally and in various embodiments to systems and methods for gathering feedback on client satisfaction for services rendered and/or products provided by an establishment through a survey process.

Although various implementations of the present invention, among many, may be described herein with reference to the specific illustrative embodiments related to particular applications, those skilled in the art will understand that the invention is not in any way intended to be limited to such embodiments and/or applications. Those having ordinary skill in the art and reference to the description of the embodiments herein will recognize additional modifications, applications, and other embodiments falling within the scope of the claimed invention and additional fields in which the present invention may be practiced.

Due to today's highly competitive business environment it may be desirable for an organization to obtain feedback from their customers or clients. This enables the organization to ascertain various levels of client satisfaction and may provide them with an advantage over their competitors. This may be especially true in many service industries, where a client's perception of the quality of the services rendered by the service provider may be the only distinction between various competing service providers.

Many methods have been devised to measure client satisfaction through the use of client surveys. Current methods, however, may not always yielded satisfactory results, due in part to the timing and the independence of administering the surveys to the clients, thus making it difficult to identify and address immediate client concerns or organizational successes. For example, most organizations administer client satisfaction surveys independent of the service itself. Most often, the surveys are performed at a much later time than when the services are rendered.

SUMMARY

In one general respect, an embodiment of the present invention is directed to a system. The system includes an automatic call distribution system adapted to communicate over a network, wherein the automatic call distribution system comprises a first software control module, and wherein the automatic call distribution system is configured to route incoming calls received from the first network; a call agent station in communication with the automatic call distribution system, wherein call agent station is configured to receive incoming calls routed from the automatic call distribution system based on the availability of the call agent station, and an interactive voice response system in communication with the automatic call distribution system, wherein the interactive voice response system is configured to administer a survey to a client in communication with the call agent station, and wherein under the control of the first software control module, the automatic call distribution system routes the incoming call from the call agent station to the interactive voice response system for administering the survey to the client.

In another general respect, an embodiment of the present invention is directed to as system that includes a system that includes an automatic call distribution system adapted to communicate over a first and second network, wherein the automatic call distribution system comprises a first software control module, and wherein the automatic call distribution system is configured to route incoming messages received from the first network and is configured to route incoming calls from the second network; a server in communication with the automatic call distribution system, wherein the server is adapted for receiving the incoming messages from the first network a call agent station in communication with the automatic call distribution system, wherein the call agent station is configured to receive the incoming messages and incoming calls routed from the automatic call distribution system based on the availability of the call agent station and an interactive voice response system in communication with the automatic call distribution system, wherein the interactive voice response system is configured to administer a survey to a client in communication with the call agent station through the first and second network, and wherein under the control of the first software control module, the automatic call distribution system routes the incoming call from the second network to the interactive voice response system for administering the survey to the client.

In yet another general respect, an embodiment of the present invention is directed to a method. The method includes a initiating a call with a call center by the client; at the call center, routing the call to a call agent; routing the call from the call agent to an interactive voice response system; and conducting a survey with the client through the interactive voice response system, wherein the interactive voice response system presents survey questions to the client.

Other systems, methods, and/or computer program products according to embodiments of the present invention will be or become apparent to one with skill in the art upon examination of the following drawings and detailed description. It is intended that all such additional systems, methods, and/or computer program products be included within this description, be within the scope of the present invention, and be protected by the accompanying claims.

DESCRIPTION OF THE DRAWINGS

Embodiments of the present invention are described herein in conjunction with the following figures, wherein.

DESCRIPTION

It is to be understood that the figures and descriptions of the various embodiments of the present invention described herein, among others, have been simplified to illustrate representative elements of a system and method for obtaining real-time client feedback that are relevant for a clear understanding of the present invention, while eliminating, for purposes of clarity, other elements. For example, call centers, automatic call distributor (ACD) systems, and interactive voice response (IVR) systems are provided as examples of systems that may provide an operating environment and be used in conjunction with various embodiments of the present invention. These systems are described herein as examples of such operating environments that cooperate to provide real-time client feedback systems to facilitate a better understanding of the present invention. Those of ordinary skill in the art will appreciate and readily understand, however, that other elements that may be found in conventional communications networks also may provide additional operating environments for embodiments of the present invention.

Various embodiments of the present invention provide systems and methods for administering client or customer surveys by or on behalf of an organization that is interested in obtaining relevant information from current or future clients about certain aspects or characteristics of the organization. The methods and systems for conducting a survey in accordance with embodiments of the present invention are interactive, real-time or near real-time and client friendly. The methods and systems do not require additional material such as pens, pencils, papers, and do not require additional personnel to administer the survey. The client can easily follow an automated interactive voice response teleprompt and provide their answers in electronic form through, for example, a touch-tone keypad or by speaking the answers. The results of the survey can be easily analyzed and tabulated and can be used for immediate action by the organization to impact client satisfaction.

Figure 1:
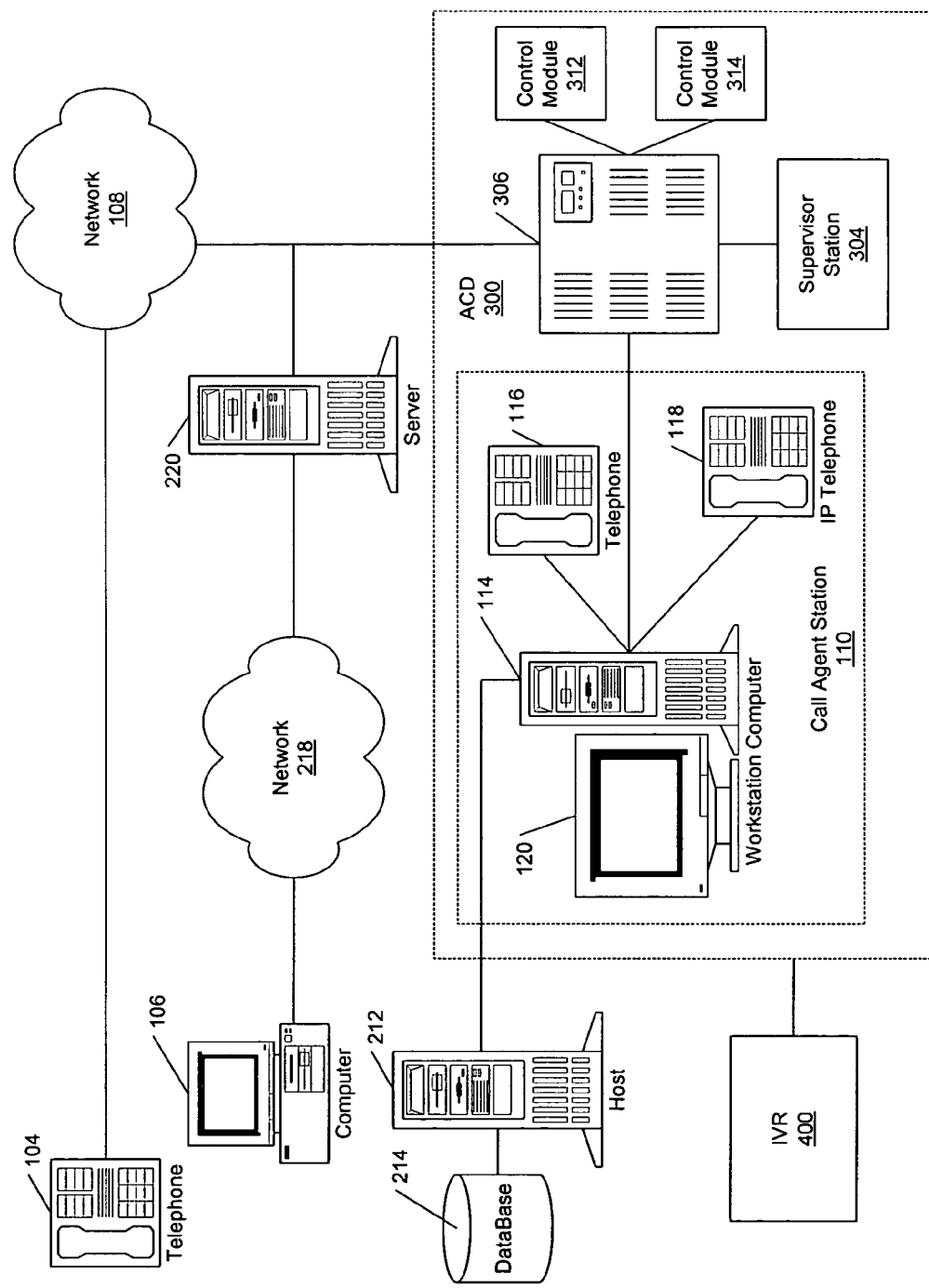
FIG. 1 illustrates various embodiments of a system for conducting client surveys according to the present invention.

FIG. 1 illustrates one of various embodiments of a system 100 according to the present invention. The system 100 comprises a call center 200 (e.g., a customer service center), an Automatic Call Distribution (ACD) system 300 in communication therewith, and an Interactive Voice Response (IVR) system 400 in communication with the with the ACD system 300. A client can communicate with the call center 200 using a variety of communication devices such as, for example, a telephone 104 (e.g., land line or wireless) that can include a touch-tone keypad or a personal computer 106. The client can communicate with the call center 200 through a network 108. The client is initially routed by the ACD system 300 to a call agent position 110 that is in communication with the ACD system 300 that is occupied by a call agent ready to assist the client 102. The call agent station 110 can include, for example, workstation computers 114 including a display screen 120, telephones 116, and Internet Protocol telephones 118. The workstation computers 114 include network connectivity. In addition, the call center 200 telephones 116 include multi-button functionality and are equipped with a headset to permit the keyboard entry of the client's information into the computer 114 by the call agent. The ACD system 300 includes one or more software control modules 312 that re-route the client to the IVR system 400 at the end of the transaction between the client and the call agent. The ACD system 300 can execute the software control modules 312 directly or a host computer associated with the call center can execute them. The ACD system 300 also may execute additional software control modules 314 for controlling various aspects of data management associated with the operation of the call center 200.

In accordance with embodiments of the present invention, at the completion of the interaction between the call agent and the client 102, the call agent transfers the client to the IVR system 400 in order to administer the survey to the client 102. The transfer may be processed automatically at the end of the transaction between the client and the call agent. For example, the client may be transferred to the IVR system 400 by the ACD system 300 associated with the call center 200, which is in communication with the call agent.

As used herein, the client may encompass, for example, a customer, shopper, consumer, patron, user, buyer, purchaser, and/or end-user of any number of services and/or products. Services can include both commercial and non-profit services, for example. An organization as used herein may encompass, for example, an individual or party that is interested in receiving feedback from existing or future clients to appraise or measure the client's perception of the organization, its services, and/or its products. Such organizations may encompass, for example, any establishment, institution, business, firm, company, concern, and/or non-profit organization and the like, that may be interested in obtaining feedback from a client. Those skilled in the art will appreciate that the survey may be administered by the organization itself, by a third party on behalf of the organization, or by a combination thereof, without departing from the scope of the invention.

Embodiments of the present invention will be described herein with respect to the administration of a client survey within the call center 200 environment. However, those of ordinary skill in the art will appreciate that other operating environments may be readily substituted without departing from the scope of the invention. In various embodiments of the present invention, the client places a call to the call center 200 in order to talk to a service representative, or the call agent. Subsequently, the call agent at the call center 200 transfers the client to the IVR system 400, for example, in order to administer a survey or questionnaire to the client 102. The survey can be administered through the IVR system 400 in an automatic fashion to gather feedback from the client soon after the interaction between the client and the call agent is complete. The call agent also may be referred to as a service agent, a customer service representative, and the like, and can be directly or indirectly associated with the organization that ultimately seeks the client feedback information. In other words, the call center 200 and the call agent can be a third party organization that is hired by the organization that seeks the client feedback information. For example, the call agent can be directly associated with the organization as an employee. The call agent also can be associated with the organization by a predetermined contractual obligation, or the call agent can be a consultant to the organization.

Those skilled in the art will appreciate, however, that although the process in accordance with various embodiments of the present invention will be described herein with respect to using the telephone 104 and the personal computer 106 as the communication interface between the client and the call agent, and/or the organization, other communication interfaces, environments, or apparatuses may be employed by the client and/or the organization to conduct the survey without departing from the scope of the present invention. For example, those skilled in the art will appreciate that embodiments of the present invention may be employed in a variety of communications environments without departing from the scope of the invention. Furthermore, the various embodiments of the present invention may be interconnected via many different types and variations of the network 108, which can be a computer network or a telecommunication network, and is not intended to be limited to the examples of the network 108 described herein. Rather, the many embodiments of the present invention may be practiced in a variety of network operating environments including, for example, computer networks and telecommunications systems comprising packet-switches, servers, and modules capable of transmitting and receiving information in the form of packets between various devices interconnected over any predetermined computer and telecommunications networks. For example, the many embodiments of the present invention can operate in various communications environments including, but not limited to, packet-switched networks, Voice over Internet Protocol (VoIp), wireless Fidelity (WiFi), Bluetooth, Ultrawideband, and other operating communications environments.

Furthermore, the client feedback systems and methods according to various embodiments of the present invention may be employed in conjunction with variations of the network 108. Such networks may include, for example, WAN, LAN, Ethernet, Internet, Web-based networks, and telecommunication networks, among others. In various environments communication between the client and the organization (e.g., the call agent) may occur over computer networks interconnected via telephone lines such as a variety of digital transmission links including those provided by the local telephone company such as, for example, a digital subscriber line (DSL), an asymmetrical digital subscriber line (ADSL), a high bit rate digital subscriber line (HDSL), a single pair symmetrical services (SDSL), an integrated services digital network (ISDN) line, a T-1 digital transmission link, and/or a wireless communication line.

Embodiments of the various components of the present invention and how they interact will now be described below. The call center 200 is a specialized environment that is equipped, staffed, and managed by an organization such as an establishment, institution, business, firm, company, concern, and/or non-profit organization and the like, to handle a large volume of incoming calls. The call center 200 includes the ACD system 300 that connects incoming calls from clients to the call agent such as, for example, an order taker, a customer-service representative, a help-desk operator, or some other type of customer representative or agent. If an appropriate call agent cannot answer some calls immediately, such calls are placed in a queue and the caller must wait for the next available call agent. While the caller is on hold, the call center 200 might play music, some form of advertising, or may periodically play messages that inform the caller of their status in the queue. The call center 200 also may provide a menu of dialing choices for the caller so that they can be routed in an appropriate way.

When an appropriate call agent is assigned to the client 102, the call agent initially addresses the client's immediate requirements or concerns. At that time, the call agent also may obtain relevant information from the client and may enter or store this information into a computer database 214 in communication with the call center 200. The stored information may be retrieved from the database 214 at a later time, such as for example, the next time the client calls the call center 200. At such time, the call agent may retrieve the stored information and view it on the call agent's computer, for example. In addition, the information stored in the database 214 can be useful if it is associated with the results of the client survey, for example, which will be administered soon after the call agent processes the client's immediate requirements or concerns. The stored information also can be associated with the call agent's position 110 or the call agent such that the client survey results can be traced to a particular call agent position or call agent.

The call center 200 is connected to the outside world via the telephone lines 204 and can subscribe to various communication services, including digital line service such as 56K, Fractional T1 or T1, and ISDN, for example. Other services can include, for example, 800 toll-free numbers to take orders or 900 numbers to provide a service, which can be charged to the client's telephone bill. The call center's 200 ACD system 300 can be a stand alone switching system or can be integrated with a PBX system that can be used to support the operations of the call center 200 without limiting the scope of embodiment of the present invention. The functionality of the ACD system 300 also can be provided by a telephone company's central office or as part of the carrier's Centrex services, for example.

The call agent interacts with the client at the call center 200 via the call agent's workstation computer 114. The call agent can use the workstation computer 114 to enter the client's personal information by filling out standard forms that appear on the display screen 120, for example. A host computer 212 and database 214 are provided in communication with the call agent's workstation computer 114. The database 214 can be used to store the client's personal information in a central location. The host computer 212 also can be used to sort the client records in a variety of ways and can be used to generate client reports, for example. Additional components of the call center 200 also can include various management information tools 216 such that managers can query the database 214 and retrieve the stored client information and can coordinate or associate such information with the client survey information, for example. The information stored in the database 214 also can include the telephone number of the call agent's position 110 or the call agent, so that the client's call can be traced to the particular call agent position 110 occupied by the call agent 110 at the time the service was rendered to the client 102, for example. If the client later chooses to answer the survey, the survey results also can be correlated or associated with the stored client information as well as the telephone number of the call agent's position 110 or the call agent who interacted with the client 102.

In various embodiments of the present invention, the call center 200 can be integrated with an external network 218 through a server 220. The network 218 can be the Internet and the server 220 can be a Web server, for example. By integrating the Internet, for example, with the call center 200, an organization can provide additional personalized services to the client through various Web sites posted by the Web server that give the client additional options and means for accessing call agents online. The client may thus initiate a transaction with the service agent online via a Web site. Further, at any time, the client can ask questions by selecting a preferred method of online communication such as, for example, by submitting a question in an online form and having the call agent respond online via e-mail, telephone, or fax. In various embodiments of the present invention, the client also can conduct transactions with the call center 200 through a call center web site hosted by the server 220 via interactive text-chat sessions with the call agent online or place a telephone call over the Internet to talk to the call agent. During a real-time transaction with the client over the call center Web site, the call agent can push Web pages to the client's computer 104 with appropriate text and images that help answer complex questions or illustrate examples.

When the client completes the transaction with the call agent online, the client may choose to participate in a client feedback survey. If the client does choose to participate in the client survey, the call center 200 can automatically transfer the client to the IVR system 400 in order to conduct the client feedback survey, for example. For example, the server 220 can re-route the client to the IVR system 400, for example, to administer the client feedback survey. Accordingly, the IVR system 400 can establish a connection with the client's telephone 104 and then proceed to conduct the survey using interactive voice commands and touch tone responses. Those skilled in the art will appreciate that the client may still be logged onto the web site while the IVR system 400 is conducting the client survey. Accordingly, the client can request online assistance while completing the survey. Those skilled in the art will appreciate that while the client is transacting with the online web service, the client also can initiate a voice call with a call agent and still view a help window provided by the server 220 to provide information about system requirements and can assist the client in placing a call to the call center 200.

The ACD system 300 is a general-purpose system that may be used by an organization to implement the various embodiments of the present invention. The ACD system 300 may be installed in any organization that handles a large number of incoming calls such as a customer service center that handles a large volume of incoming calls and employs a plurality of call agents whose responsibilities are almost entirely restricted to handling the incoming calls. The ADC system 300 can be used to rapidly direct calls from calling clients 120 to various call agents that either are available or are qualified (e.g., have the appropriate technical expertise) to address the client's initial request. The ACD system 300 can be used in any one of the following, call center 200 environments or applications, among others: customer service centers; help desk; order entry; credit authorization; reservations; insurance claims; and catalog sales, for example. The ACD system 300 can incorporate the latest call-processing technology and benefit from the improvements made in the public switched telephone network, developments in Computer Telephony Integration (CTI), the Internet, and advancements in personal computer related technologies, such as, for example, multimedia technology.

The ACD system 300 is used to greet clients with recorded messages, provide a menu of dial options, and also can be used to route incoming calls to the appropriate call agents 112. The ACD system 300 also can be used to re-route a client's call to the IVR system 400 to conduct a survey shortly after the interaction between the client 120 and the call agent. As discussed above, an organization may wish to conduct a survey shortly after the interaction between the client and the call agent so that the information garnered from the client is more meaningful. The ACD system 300 also can be linked via private lines to handle calls from within an organization and to form a distributed call-processing system that can route incoming calls over the network 108, 218 to various locations of the organization and then re-route the client to the IVR system 400 in order to conduct the client survey. The ACD system 300 also can handle incoming calls from the network 218 (e.g., the Internet). The ACD system 300 can re-route the client to IVR system 400, once the client completes the transaction with the call agent and can then complete the client survey.

In various embodiments of the present invention, the ADC system 300 executes the software control module 312 for re-routing the client to the IVR system 400. The ADC system 300 also can execute a variety of other software control modules 314 for performing call management and statistical reporting functions such as, for example, tracking the number of incoming calls handled, tracking the number of clients who elected to participate in the survey, tracking the number of clients that were successfully re-routed to the IVR system 400, tracking the number of clients that initially agreed to conduct the survey but later chose to abandon the process, and other tracking functions. The software control modules 314 also can perform the functions of associating the client's telephone number to the call agent's identification number, associating the client's personal information with the call agent's identification number, associating the results of the survey with the call agent's identification, associating the survey results with the client's personal information, and other association management functions. All of the management and statistical information can be stored in the database 214 and can be accessed by the host computer 212 through the call agent's workstation computer 114 or by any number of computers and other processing devices referred to herein as the management information tools 216.

The software modules 312, 314 in accordance with the various embodiments of the present invention described herein can comprise a software application (e.g., operating system, browser application, client application, server application, proxy application, on-line service provider application, and/or private network application) installed on the ACD system 300, the agent workstation computer 114, and/or the host computer 212, for example, for directing the execution of instructions. Other examples may include a computer program, code, a set of instructions, or some combination thereof, for independently or collectively instructing the ACD system 300, the agent workstation computer 114, and/or the host computer 212, for example, to interact and operate as programmed. The control modules 312, 314 may be implemented utilizing any suitable computer language (e.g., C\C++, UNIX SHELL SCRIPT, PERL, JAVA, JAVASCRIPT, HTML/DHTML/XML, FLASH, WINDOWS NT, UNIX/LINUX, APACHE, RDBMS including ORACLE, INFORMIX, and MySQL) and/or object-oriented programming techniques. The control modules 312, 314 also may comprise a device, such as a workstation or PC, a microprocessor, a microcontroller, a network server, a Java virtual machine, an application-specific integrated circuit, a programmable logic array, and/or a fixed logic array, and is not limited to software instructions alone.

The ACD system 300 also comprises, for example, a plurality of incoming communication lines 302, a plurality of call agent positions 110, one or more supervisor positions 304, and a switch 306 for performing the actual call routing and distribution. Although any type of communication line 302 can be connected to the ADC system 300, various embodiments of the present invention can include communication lines such as, for example, toll-free 800 lines, plain old telephone service (POTS) lines, Integrated Services Digital Network (ISDN) lines, ISDN Primary Rate Interface (ISDN PRI) lines, and others, for example. The ACD system's 300 incoming communication lines 302 also can be routed through a PBX 310, for example in systems that use digital T1 trunks to carry both ACD related calls and other general call traffic. As discussed previously, the ADC system 300 also comprises a software control module 312 that automatically transfers a client call from the call agent to the IVR system 400 to conduct the client survey and gather immediate client feedback data. The ACD system 300 thus can automatically re-route the client to the IVR system 400 at the end of the exchange between the client and the call agent if the client agrees to participate in the survey.

The features and functions of the ACD system 300 in accordance with the various embodiments of the present invention can be implemented using various types of equipment and services. For example, embodiments of the present invention can utilize a stand-alone ACD system that can be used in conjunction with client service centers that are remotely located from the rest of the organization and where the ACD system's functions do not need to be integrated with the organization's telephone system. For example, a client's call can be re-routed to an IVR system that is located remotely outside the organization's telephone system without departing from the scope of the present invention. The ACD system 300 functionality also can be integrated as part of a PBX key telephone system comprising the ACD system 300 software control modules 314 in addition to the software control module 312.

Those skilled in the art will appreciate that the ACD system 300 can be a system component based on a personal computer or a workstation with additional software control modules or functions such as voice mail, interactive voice response, intelligent queue announcements, computer integration, and the software control modules 312, 314 discussed above. These additional software control modules also can be used to collect client call statistics and generate management reports on the client's usage and acceptance rate of the offer to participate in a survey.

Embodiments of the present invention can utilize other types of ACD systems comprising, for example, automatic call sequencers that are independent devices that operate without a switching matrix of their own. These systems perform the same type of call-to-agent station allocation as the conventional switch based ACD system 300. These systems can be simpler to operate and implement than the conventional ACD system 300 because they rely on the PBX for routing calls. Other embodiments of the present invention may be based on Centrex systems where the telephone company provides the ACD functionality and features as part of its Centrex service. Also, telephone company central office-based systems may be implemented where the telephone company provides ACD functionality and features as a service that is separate from Centrex. Further, third-party service firms may be contracted by an establishment to provide its ACD service.

The operation of the ACD system 300 is geared towards maintaining a certain predetermined level of productivity of the call agents through the efficient distribution of incoming client calls. Managerial personnel such as, for example, a supervisor, or master, may be positioned at the supervisor positions 304 within the ACD system 300. Such managerial personnel have the ability of monitoring individual client calls, call agents 112, and the overall ACD system 300 activity. The client survey results can be delivered to the managerial personnel in real-time. Therefore, the managerial personnel can take immediate action based on the client survey results.

Various embodiments of the present invention can utilize the ACD system 300 to answer a telephone call placed by the client either on the first ring or after a fixed number of rings, and then examine preprogrammed processing tables for routing instructions while the client is placed on hold. The ACD system 300 also can answer calls dynamically by sensing an incoming client call and searching through predetermined routing schemes before answering the call. Once the client call is answered, other systems such as the IVR system 400 may be used to gather additional information and compare that information with the customer database 214 before passing the call to the call agent position 110. The IVR system 400 also may present a query to the client 120 regarding whether the client 120 would be willing to participate in a survey once the transaction with the call agent is complete. Although such structure can be provided within a variety of ACD systems, embodiments of the ACD system 300 according to the present invention include the software control module 312 for re-routing the client's call to the IVR system 400 when the current transaction is complete. Other embodiments of the ACD system 300 can include, for example, other methods of allocating client calls, use of different types of system management reports, and also can comprise various control features.

Various embodiments of the present invention also can comprise a Web-based ACD system 300 within the call center 200 environment that operates on the network 218, which may be a corporate based IP-based intranet or the Internet, for example. Such Web based ACD system 300 environments allow a client user to click on a link provided through a Web page such that a voice connection can be established over the network 218 between the client and the call agent. The call is then transferred to the ACD system 300, where it is routed to the next-available call agent at one of the call agent positions 110. Such Web based ACD system 300 can then re-route the client call to the IVR system 400 to conduct a client survey under the control of software control module 312.

The client using such a Web based ACD system 300 can reach the call agent by using the personal computer 106 and clicking on a link provided on the Web site. The ACD system 300 can be a Windows NT-based PNX ACD system, for example. An H.323 call setup occurs between the customer and the ACD system 300. When the call agent is available, an outbound call can be placed to the call agent so that the client and the call agent can conference together. All of the H.323/T.120 packets go through the ACD system 300. Once the call arrives, the call agent uses an interface that includes call-context information, which can include the name of the client 102, account number, currently viewed URL, subscriber service level, the last time the client placed a call, and the results of the client survey if the client previously completed one. If the client previously completed a survey, the results of that survey can be associated with the previous call agent position 110 and the client can be routed to the same call agent position 110 if the survey results were favorable, or can be routed away from that client attendant position 110 if the results were negative. In addition, the interface can include a virtual button or other means to initially ask the client whether they wish to participate in a client survey. The interface also can include another virtual button or other means to re-route the client to the IVR system 400 to actually conduct the survey.

In general, the IVR system 400 enables the client to conduct transactions with an organization without a live attendant. The IVR system 400 uses a telephone keypad as an information retrieval and data gathering medium. In general, a recorded voice message prompts the client with questions and a menu of choices for each question. The client then responds to the inquiries or commands by using the telephone touch tone keypad, for example. In various embodiments of the present invention, the IVR system 400 conducts the client survey by presenting one or more questions to the client from a predetermined list of questions stored in a computer by way of announcements. This type of communication exchange also can be referred to as audiotext. As discussed previously, the client is re-routed to the IVR system 400 by the ACD system 300 once the client completes a transaction with the call agent.

In various embodiments of the present invention, the IVR system 400 accepts the call transferred from the ACD system 300 and administers a predetermined client survey by asking the client a number of questions in multiple-choice answer format. The client can respond to each question by entering the appropriate digit from the telephone 104 using its touchtone keypad after the pre-recorded announcement. This type of IVR system 400 based client survey provides requested information to the organization immediately after the client completes a transaction with the call agent. Thus, the information provided in response to the survey is fresh, more likely to be accurate, and it is more likely that the client will actually engage in and participate in the survey. This enables the organization to meet its need for client feedback information efficiently and economically without having to devote additional staff to administer routine survey questions. Also, because the survey is administered over the IVR system 400 and responses are received electronically in real-time, the survey results can be easily and immediately tabulated and analyzed. Thus, a manager at the call center 200 supervisor position 304 can take immediate action and make routing adjustments within the call center 200 based on the real-time survey results. For example, if one of the call agent positions 110 consistently receives negative treatment on various client surveys, the manager can immediately begin routing incoming calls from clients away from that particular call agent position 110 or call agent, for example. Conversely, if the survey results indicate that the particular client 120 is pleased with the call agent at a particular call agent position 110, the manger can take steps to route calls from that particular client to the preferred attendant position 110. What makes this possible is the ability of associating the particular call agent position 110 identification information (e.g., telephone extension number) with the results of the client survey and storing this information in the database 214.

The IVR system 400 can take many forms. For example, the IVR system 400 can be a stand alone system. The IVR system 400 can be an integral function of a PBX or ACD system 300, for example. In other embodiments, a telecommunications carrier can provide the IVR system 400 as a service. Thus, an organization can offer their clients a variety of call processing functions, including interactive voice response. In other embodiments, the IVR system 400 can be custom designed for the particular application of conducting and administering the client survey.

Organizations are able to improve client service by offering the client a mechanism for providing immediate feedback to the organization soon after utilizing services provided by the organization while the information is still fresh in the client's mind by utilizing the IVR system 400 to implement client surveys. This also provides the organization with a more consistent way of exchanging information and transacting business with their clients via the telephone 104, for example. Large inventories of survey literature and handling of survey responses filled out on paper can be eliminated and thus can reduce the cost of storing, administering, interpreting, and maintaining the responses. Mailing expenses can also be reduced.

Embodiments of the present invention also provide IVR systems 400 that operate with touch-tone telephones 320 as well as voice capture. Further, although the IVR system 400 can deliver survey questions via recorded voice announcements, the information also can be delivered to the client in printed form, such as, for example, by using fax on demand functionality or fax back that enables the client to select any one or more documents from a menu of available items that is described to them over the IVR system 400. Thus, the client can receive information at their fax machine instantly and can provide feedback to the responses using the telephone 104 with touch-tone features, for example.

The process flow and navigation of the IVR system 400 can be illustrated by the following example. The client calls into a service call center 200 to receive assistance on a product purchased, service rendered, or to receive a service from an establishment that provides the product or service or that is acting as an agent or representative of the actual provider (e.g., the organization). The ACD system 300 at the call center routes the client to an available call agent that is capable of assisting the client 102. If no call agents are available at that time, the ADC system 300 keeps the client on hold until an appropriate call agent becomes available. Once the client completes the transaction with the call agent, the call agent asks the client whether they wish to participate in a client survey. If the client 120 chooses to participate in the survey, the client is instructed to remain on the line. In the meantime, under the control of the software control module 312, the call is automatically re-routed by the ACD system 300 to the IVR system 400. The client is then provided with the directions for completing the survey and the client responds to the questions using the telephone 104 with a touch-tone keypad or may audibly provide the answers if the IVR system 400 is equipped with a voice activated response system. The responses are captured, recorded, time stamped, and optionally tagged for client call back. Once the survey is completed, the client may hang up.

Embodiments of the present invention also can provide additional built-in editing features to allow the client to correct their answers to any submitted responses. These features can be used to eliminate errors that may be made during the survey process. Also, during the survey process, the client can be provided with customized surveys that are specifically tailored for a particular demographic based on information about the client stored in the database 214. The client also can choose one or more different surveys for which they are eligible from a menu listing all the available options of different surveys.

In other embodiments, the IVR system 400 can take into account whether the client is a first time caller to the call center 200 or a first participant of the survey process. If so, the IVR system 400 can be configured to guide the client through the survey process using more detailed options or instructions, for example.

Figure 2:
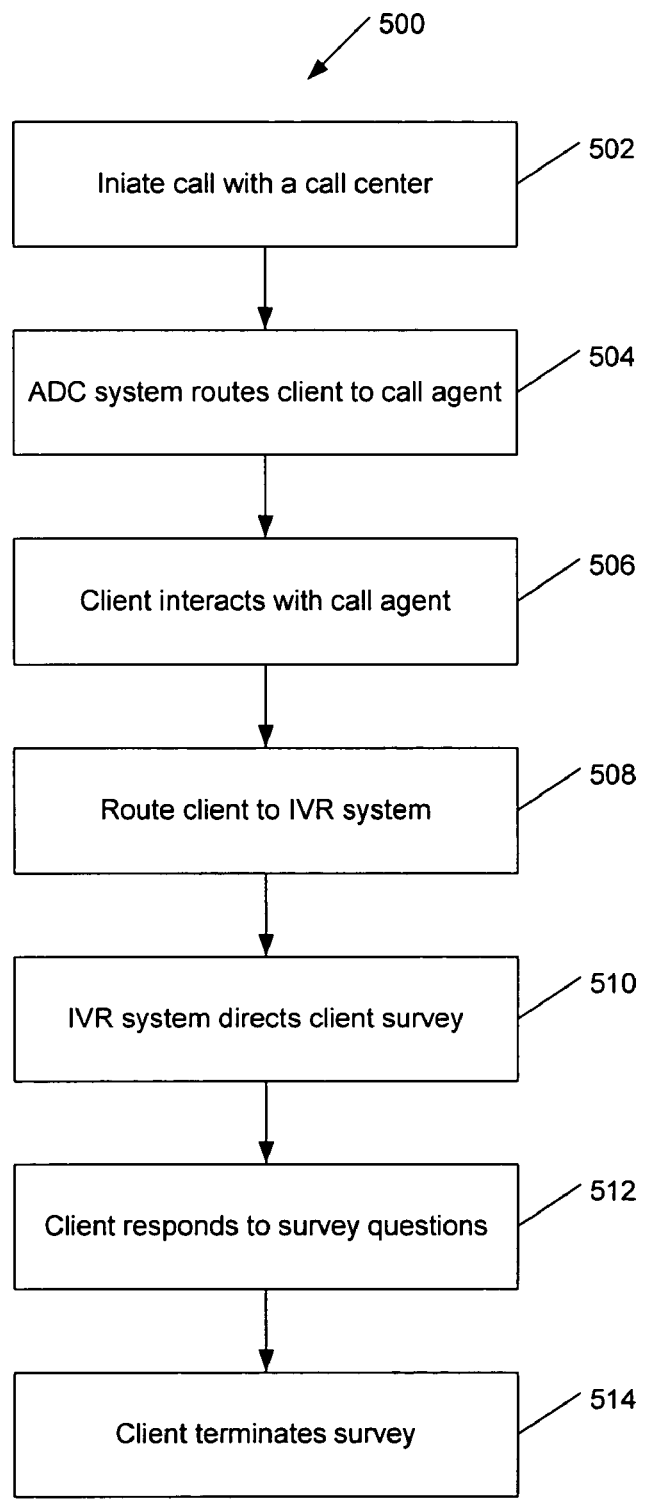
FIG. 2 is a process flow diagram of the survey process of various embodiments of the present invention.

FIG. 2 is a process flow diagram 500 of various embodiments of the present invention. The process flow diagram 500 describes the steps that are executed in order to administer the client survey. At block 502 the client initiates a transaction with the organization by placing a telephone call to the main number of the organization's call center 200 using the telephone 104. At block 504 the ACD system 300 of the call center 200 initially routes the client to the appropriate call agent or service representative. At block 506, after the call agent interacts with the client 102, the call agent notifies the client that they may choose to answer a survey, such as for example, a customer satisfaction survey. If the client agrees to participate in the survey, the call agent instructs the client to remain on the line. At block 508, the ACD system 300 under the control of software module 312, for example, then re-routes the call to the IVR system 400, for example, to administer the survey. At block 510 the client listens to the directions for conducting the survey and listens to the questions posed by the IVR system 400. At block 512 the client responds to the questions asked in the survey using either the touch-tone keypad of the telephone 104 or a voice activated response mechanism. At block 514 the client's responses, or data, are recorded, time stamped, and, optionally, tagged for client callback. At the end of the survey, the client may terminate the connection by hanging up the telephone at block 516.

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

The invention claimed is:

1. A system, comprising:
  an automatic call distribution system adapted to communicate over a network, wherein the automatic call distribution system comprises a first software control module, and wherein the automatic call distribution system is configured to route incoming calls received from the network;

a call agent station in communication with the automatic call distribution system, wherein the call agent station is configured to receive incoming calls routed from the automatic call distribution system based on the availability of call agent station;

an interactive voice response system in communication with the automatic call distribution system, wherein the interactive voice response system is configured to administer a survey to a client in communication with the call agent station, and wherein, under the control of the first software control module, the automatic call distribution system routes the incoming call from the call agent station to the interactive voice response system for administering the survey to the client, the survey prompting the client to provide information about aspects of services received; and a web server accessible by the client over the Internet, the web server providing online assistance to the client while the client is completing the survey administered by the interactive voice response system;

wherein results of a previously administered survey are associated with the call agent position, the association used to identify the previously administered survey and the corresponding call agent;

wherein upon receiving a second call from the client:

if results of the previously administered survey are positive with respect to client satisfaction of the services received from the call agent, the second call is routed to the call agent; and if results of the previously administered survey are negative with respect to client satisfaction of the services received from the call agent, the second call is routed to different call agent.

2. The system of claim 1, wherein the interactive voice response system is adapted for receiving survey responses in touch-tone format.

3. The system of claim 1, further comprising a database in communication with the automatic call distribution system.

4. The system of claim 2, wherein survey responses are stored in the database.

5. The system of claim 2, wherein survey responses are associated with the client.

6. The system of claim 2, wherein the survey responses are associated with the call agent station.

7. The system of claim 1, further comprising a supervisor station in communication with the automatic call distribution system, wherein a supervisor at the supervisor station makes incoming call routing decisions based on the results of the survey.

8. The system of claim 1, further comprising a second software control module for controlling one or more aspects of survey response data management and associating the survey response data with the client.

9. A system, comprising:

an automatic call distribution system adapted to communicate over a first network and a second network, wherein the automatic call distribution system comprises a first software control module, and wherein the automatic call distribution system is configured to route incoming messages received from the first network and is configured to route incoming calls received from the second network;

a server in communication with the automatic call distribution system, wherein the server is adapted for receiving the incoming messages from the first network;

a call agent station in communication with the automatic call distribution system, wherein the call agent station is configured to receive the incoming messages and incoming calls routed from the automatic call distribution system based on the availability of the call agent station;

an interactive voice response system in communication with the automatic call distribution system, wherein the interactive voice response system is configured to administer a survey to a client in communication with the call agent station through the first and second networks, and wherein under the control of the first software control module, the automatic call distribution system routes the incoming call from the second network to the interactive voice response system for administering the survey to the client, the survey prompting the client to provide information about aspects of services received; and a web server accessible by the client over the Internet, the web server providing online assistance to the client while the client is completing the survey administered by the interactive voice response system;

wherein results of a previously administered survey are associated with the call agent position, the association used to identify the previously administered survey and the corresponding agent;

wherein upon receiving a second call from the client:

if results of the previously administered survey are positive with respect to client satisfaction of the services received from the call agent, the second call is routed to the call agent; and if results of the previously administered survey are negative with respect to client satisfaction of the services received from the call agent, the second call is routed to a different call agent.

10. The system of claim 9, wherein the first network is the Internet.

11. The system of claim 9, wherein the second network is a telephone network.

12. The system of claim 9, wherein the call agent station further comprises an Internet Protocol telephone.

13. The system of claim 9, further comprising a second software control module for controlling one or more aspects of survey response data management and associating the survey response data with the client.

14. The system of claim 9, further comprising a database for storing information associated with any one of the survey, the client, and the call agent station.

15. A method of conducting a survey with a client, comprising:

initiating a call with a call center by the client;

at the call center, routing the call to a call agent;

routing the call from the call agent to an interactive voice response system;

conducting a survey with the client through the interactive voice response system, wherein the interactive voice response system presents survey questions to the client, the survey prompting the client to provide information about aspects of services received; and providing the client access to a web server over the Internet, the web server providing online assistance to the client while the client is completing the survey administered by the interactive voice response system;

wherein results of a previously administered survey are associated with the call agent position, the association used to identify the previously administered survey and the corresponding agent;

wherein upon receiving a second call from the client:

if results of the previously administered survey are positive with respect to client satisfaction of the services received from the call agent, routing the second call to the call agent; and if results of the previously administered survey are negative with respect to client satisfaction of the services received from the call agent, routing the second call to a different call agent.

16. The method of claim 15, further comprising: initiating a transaction between the client and the call agent; and routing the call from the call agent to the interactive voice response system upon termination of the transaction with the call agent.

17. The method of claim 15, further comprising: receiving responses to the survey questions via touch tone telephone format; and storing the responses in a database.

18. The method of claim 17, further comprising: analyzing the responses; and adjusting routing traffic in the call center according to the analysis.

19. The method of claim 15, further comprising associating the responses according to a client identification number.

20. The method of claim 19, further comprising associating the responses according to a call agent station identification number.

* * * * *